United States Patent
Wang et al.

(10) Patent No.: US 8,087,149 B2
(45) Date of Patent: Jan. 3, 2012

(54) SELF-PIERCING RIVET AND METHOD OF JOINING WITH BONDED RIVETED JOINTS

(75) Inventors: Pei-Chung Wang, Shanghai (CN); Robin Stevenson, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 588 days.

(21) Appl. No.: 12/248,079

(22) Filed: Oct. 9, 2008

(65) Prior Publication Data

US 2010/0088880 A1    Apr. 15, 2010

(51) Int. Cl.
*B21J 15/02* (2006.01)
*F16B 19/08* (2006.01)

(52) U.S. Cl. ............... 29/525.06; 29/525.13; 29/525.05; 29/525.01; 411/82; 411/501

(58) Field of Classification Search ................. 29/524.1, 29/525.01, 525.05, 525.06, 525.13, 432; 411/82, 82.3, 501, 930
See application file for complete search history.

(56) References Cited

U.S. PATENT DOCUMENTS

| | | | | |
|---|---|---|---|---|
| 4,693,652 A | * | 9/1987 | Sweeney | 411/23 |
| 4,712,957 A | * | 12/1987 | Edwards et al. | 411/82.1 |
| 5,253,965 A | * | 10/1993 | Angel | 411/82 |
| 6,012,888 A | * | 1/2000 | Meyer et al. | 411/82.3 |
| 6,484,471 B2 | * | 11/2002 | Steed et al. | 52/704 |
| 6,694,597 B2 | | 2/2004 | Wang et al. | |
| 6,732,420 B2 | | 5/2004 | Wang et al. | |
| 6,905,295 B2 | | 6/2005 | Stevenson et al. | |
| 6,962,469 B2 | | 11/2005 | Wang et al. | |
| 7,017,255 B2 | | 3/2006 | Wang et al. | |

* cited by examiner

*Primary Examiner* — Essama Omgba
(74) *Attorney, Agent, or Firm* — Quinn Law Group, PLLC (57) ABSTRACT

A rivet configured to provide a strengthened rivet joint capable of acting as a load-bearing joint, such as in a vehicle, is provided. A method of joining a multiple member workpiece utilizing the rivet is also provided. The rivet includes a head portion and an annular body portion extending from the head portion. The body portion has an open end opposite the head portion. The head portion and the annular body portion define an interior cavity that opens at the open end. The annular body portion has an inner surface at the interior cavity and an outer surface opposite the interior cavity. The body portion has passages extending through the body portion from the inner surface to the outer surface, and grooves running along the outer surface intersecting with the passages.

5 Claims, 8 Drawing Sheets

SELF-PIERCING RIVET AND METHOD OF JOINING WITH BONDED RIVETED JOINTS

TECHNICAL FIELD

The invention relates to a self-piercing rivet and a method of joining members using the rivet.

BACKGROUND OF THE INVENTION

Self-piercing rivets are fastening mechanisms that have been widely used for the joining of non-ferrous materials and have demonstrated capability in joining ferrous materials as well. Self-piercing rivets join overlapping members by driving the rivet under pressure into the members, and creating a mechanical interference between the members and the rivet by using a die to modify the rivet geometry.

SUMMARY OF THE INVENTION

A riveted joint may be subjected to periodic loading which may cause long term loosening and incremental local deformations that reduce the direct contact between the rivet and the joined members which is integral to maintaining the joint strength. Additionally, if the materials of the joined members are dissimilar, such as with a ferrous and a non-ferrous metal, corrosion may occur if a gap is formed due to loosening of the joint. Thus it would be desirable to further strengthen and seal a riveted joint by combining the mechanical strength of the riveted structure with bonding between the rivet and the joined members.

A rivet configured to provide a strengthened rivet joint capable of acting as a load-bearing joint, such as in a vehicle, is provided. A method of joining a multiple member work-piece utilizing the rivet is also provided. The rivet includes a head portion and an annular body portion extending from the head portion. The body portion has an open end opposite the head portion. The head portion and the annular body portion define an interior cavity that opens at the open end. The annular body portion has an inner surface at the interior cavity and an outer surface opposite the interior cavity. The body portion has passages extending through the body portion from the inner surface to the outer surface, and grooves running along the outer surface intersecting with the passages. Thus, when adhesive is stored within the interior cavity, at an appropriate viscosity, the adhesive will flow through the passages and along the grooves when pressure is applied to the adhesive through the open end. When the rivet interlocks the work-piece, the adhesive will create a bond between the rivet and the members of the work-piece, strengthening and sealing the joint.

A method of joining first and second members, which is especially useful if the members are dissimilar materials, includes providing the rivet described above, driving the rivet into the first and second members to establish a riveted joint, thereby forcing the adhesive through the passages to the grooves to bond the riveted joint. The method may include heating the adhesive prior to forcing the adhesive through the passages, in order to establish an appropriate viscosity to allow such flow. For example, the heating may be resistance heating via an electrical current running through the die used to drive the rivet.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
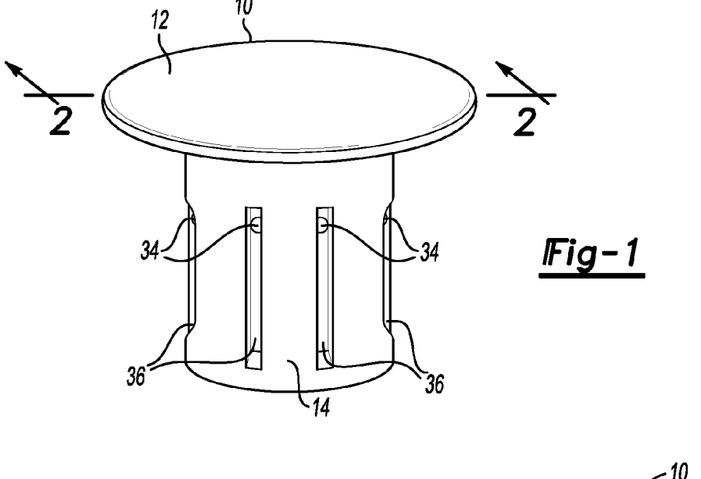
FIG. 1 is a schematic perspective illustration of a rivet.
Figure 4:
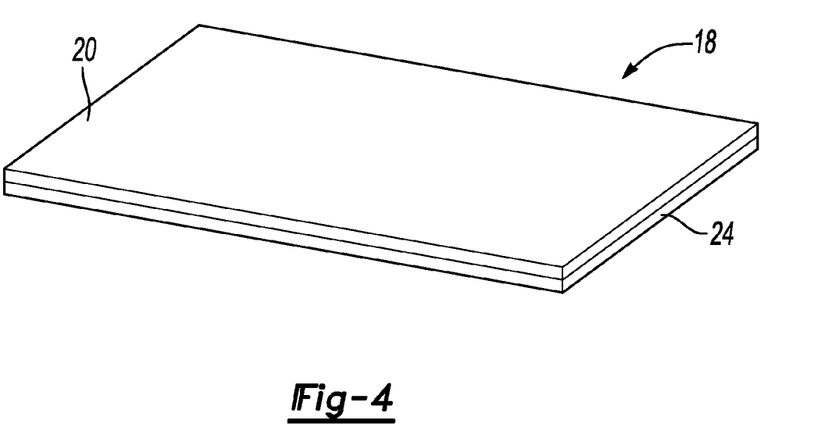
FIG. 4 is a schematic perspective view of a work-piece of stacked metallic sheets.
Figure 5:
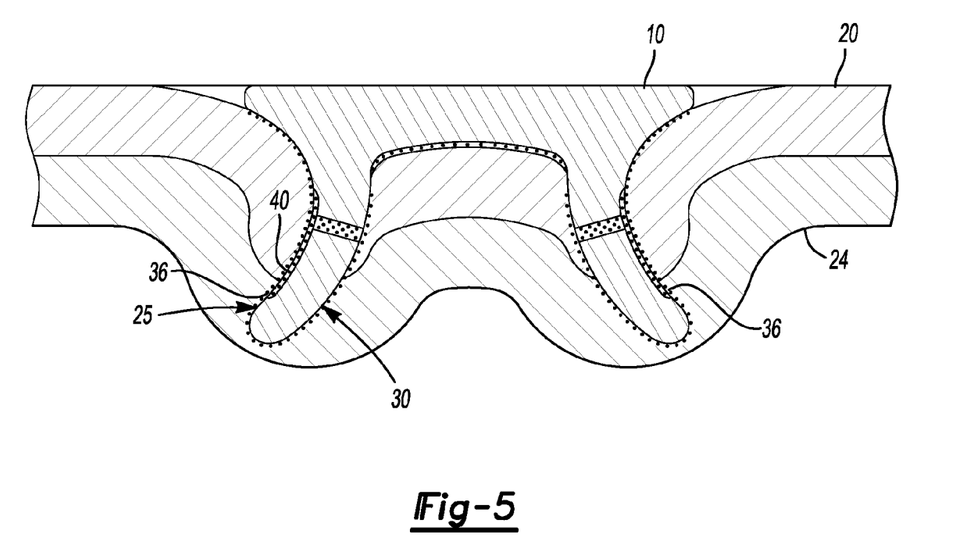
FIG. 5 is a schematic cross-sectional view of the rivet of FIGS. 1-3 interlocking and bonded to the sheets of FIG. 4 with the adhesive bonding the outer surface of the rivet to the sheets.

Referring to the drawings, wherein like reference numbers refer to like components throughout the several views, FIG. 1 shows a rivet 10 with a head portion 12 and a generally cylindrical hollow body portion 14, also referred to as a shank portion. The body portion 14 is tapered to a piercing edge 16, shown in FIG. 2, that is sufficiently sharp to pierce a work-piece 18 of FIG. 4 when subjected to a driving force, such as may be achieved by a punch acting on the head 12, in order to mechanically interlock a top sheet 20, also referred to as a second member, and a bottom sheet 24, also referred to as a first member, of the work-piece 18. The shank 14 pierces and enters all of the sheets, passing through the top sheet 20, but does not completely pass through bottom sheet 24. The shank 14 and the material of bottom sheet 24 immediately adjacent to shank 14 are deformed through the action of a lower die 32 in order to mechanically interlock the two sheets 20, 24. The rivet 10 is referred to as a "self-piercing" rivet, as the piercing edge 16 is sufficiently sharp to penetrate the sheets 20, 24, under the force of a die set, and the body portion 14 is configured to deform to create a mechanical joint or interface, without requiring a lead hole for the rivet 10 in the sheets 20, 24. As shown in FIG. 5, the rivet 10 is forced through the top sheet 20 and only penetrates but does not pass through the bottom sheet 24. It should be appreciated that more than two sheets may be stacked together; in any such embodiments, the rivet pierces and passes through all sheets except for the bottom sheet, which it only penetrates, but does not pass completely through.

Figure 3:
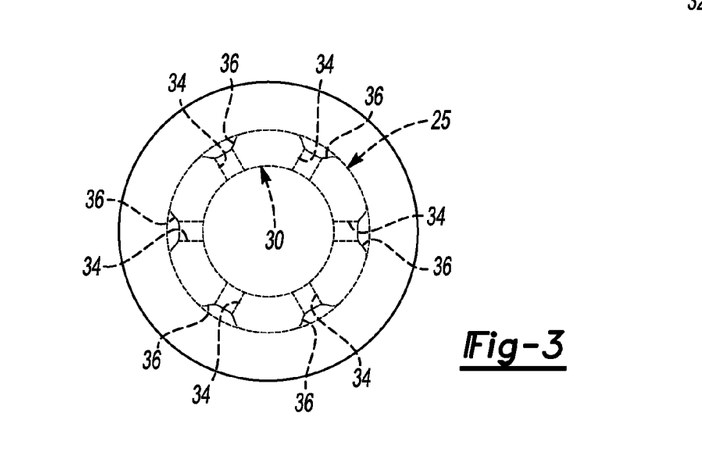
FIG. 3 is a schematic plan view of the rivet of FIGS. 1 and 2.

The rivet 10 is configured to enable the rivet 10 and sheets 20, 24 to be bonded to one another at the outer surface 25 of the rivet 10. Specifically, the annular body portion 14 and head portion 10 form an interior cavity 28 surrounded by an interior surface 30 of the body portion 14. The body portion 14 has an open end 32 at the piercing edge 16. Substantially equally spaced passages 34 extend through the body portion 14 from the interior surface 30 to the outer surface 25. As best seen in FIG. 3, the passages 34 are spaced about the circumference of the cylindrical body portion 14. At the outer surface 25, similarly spaced grooves 36 extend substantially from the head portion 12 to the piercing edge 16. The grooves 36 may be U-shaped or squared channels that appear as recesses in the surface 25, or may have any other suitable cross-sectional shape. The grooves 36 intersect with the passages 34; that is, each passage 34 empties into a different one of the grooves 36 at the surface 25.

An adhesive 40 is stored within the cavity 28 and is of a viscosity that will cause it to remain within the cavity 28 when the surroundings are within a predetermined temperature range typical of pre-riveting conditions, i.e., during shipping, and storage of the rivet 10. However, when subjected to the joining methods illustrated in FIGS. 6-10 and in the flow diagram of FIG. 11, the adhesive 40 is forced through the passages 34 and along the grooves 36 to bond the outer surface 25 of the rivet 10 to the members 20, 24, thus bonding the mechanical joint. Some of the adhesive remains in the interior cavity 28 and bonds the inner surface 30 to the members 20, 24, as well.

Figure 2:
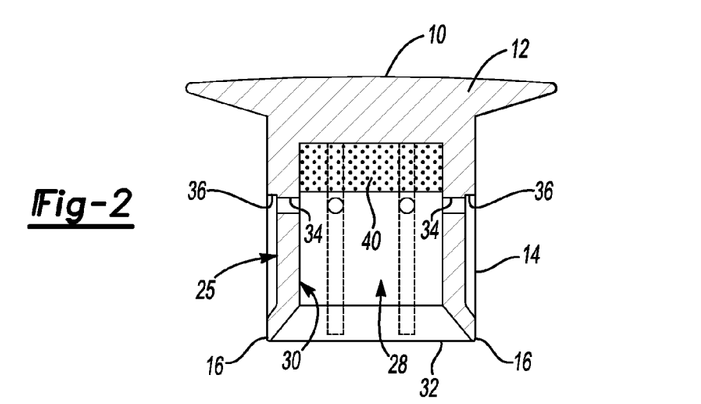
FIG. 2 is a schematic cross-sectional illustration of the rivet of FIG. 1 taken at line 2-2 shown in FIG. 1 showing adhesive stored in the rivet and passages and grooves in the rivet.
Figure 6:
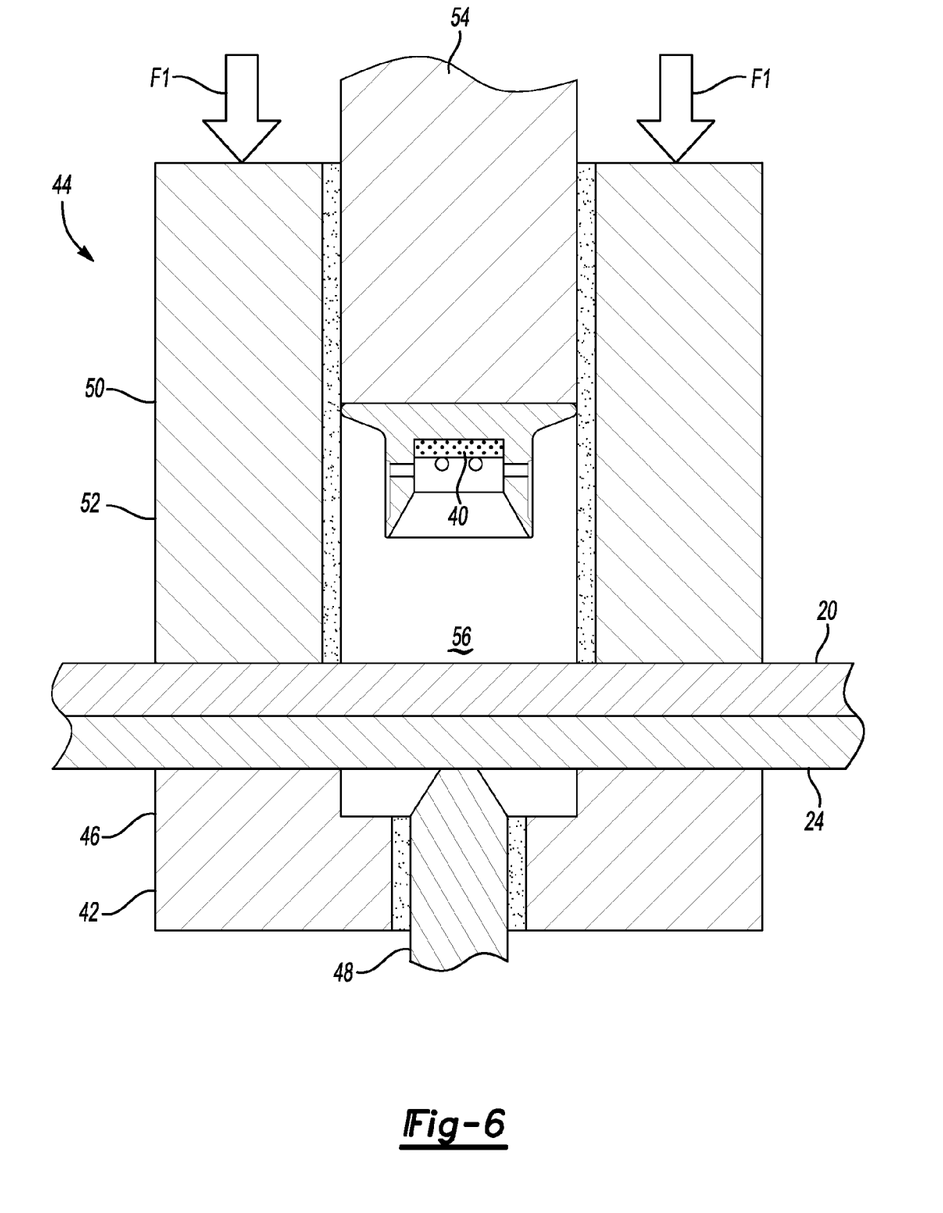
FIG. 6 is a schematic cross-sectional view of a die set and rivet assembly clamping the sheets, which are shown in fragmentary cross-sectional view.
Figure 7:
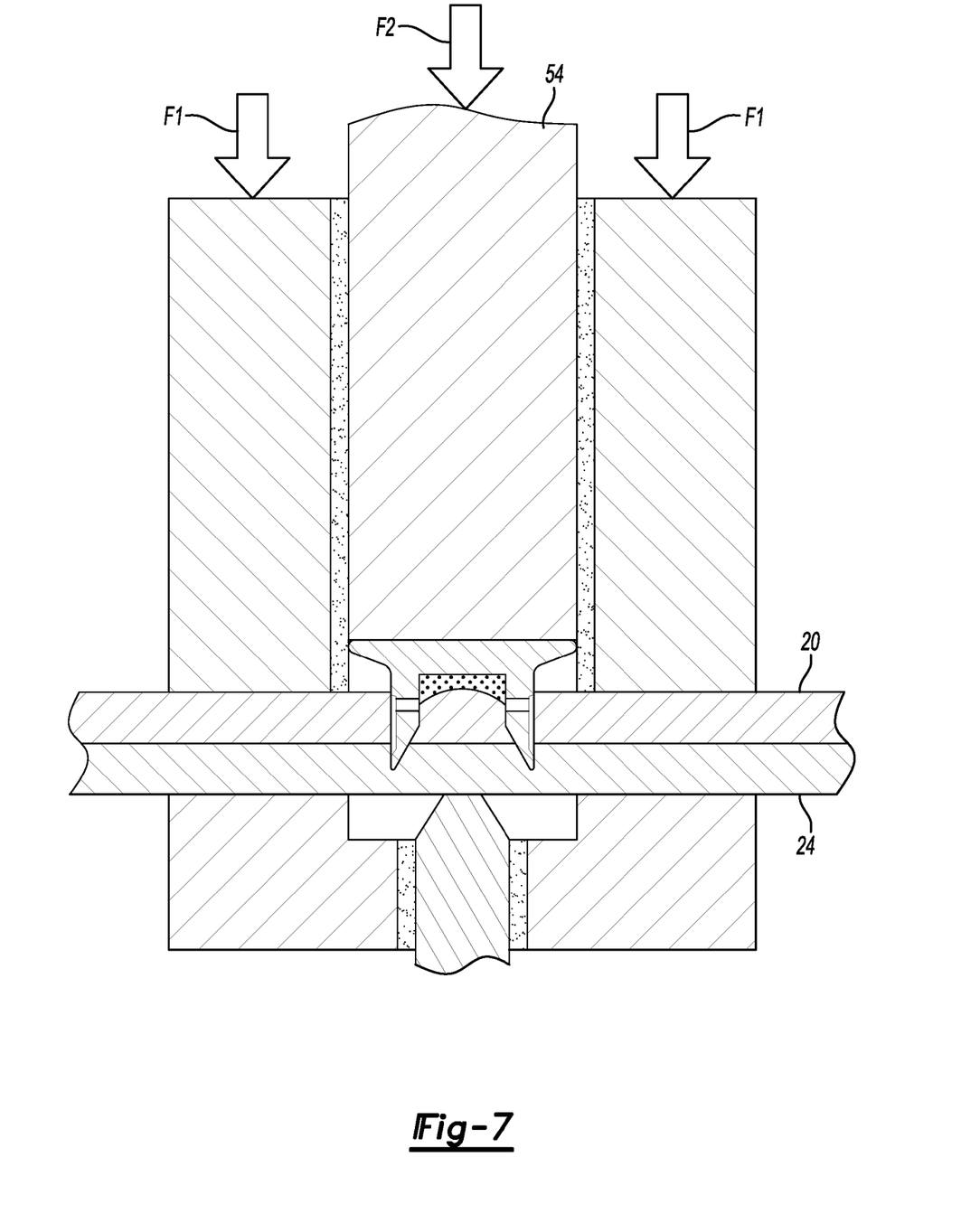
FIG. 7 is a schematic cross-sectional view of the die set of FIG. 6, with an upper punch causing the rivet to pierce the sheets.

Referring to FIG. 6, the stacked sheets 20, 24 are rested on a lower composite die 42 of a die set 44. The lower composite die 42 has a stationary annular outer portion 46 and a movable die portion 48 within the annular portion 46. The die set 44 also includes an upper die 50 that has a clamp 52 and a punch 54 movable within the clamp 52. A downward clamping force F1 clamps the sheets 20, 24 between the dies 42, 50. The rivet 10 of FIGS. 1-3 is positioned within a die cavity 56 and the punch 54 is driven downward by a force F2 to pierce the stacked sheets 20, 24, as illustrated in FIG. 7, until the upper surface of the top sheet 20 contacts the adhesive 40, causing a rapid increase in force F1. The rapid increase in force F1 is monitored, and acts as a signal to cease driving. The increase in force F1 is independent of the length of the rivet 10, the volume of adhesive 40, the nature of the adhesive 40, etc., and so serves as a reliable indicator of the appropriate time to cease driving the rivet 10, so that the adhesive 40 may be heated prior to being forced from the interior cavity 28. Deformation of the top sheet 20 creates a slight dome on the upper surface thereof within the cavity 28, permitting access for the adhesive 40 to later flow outward through channels 34 (numbered in FIG. 2).

Figure 8:
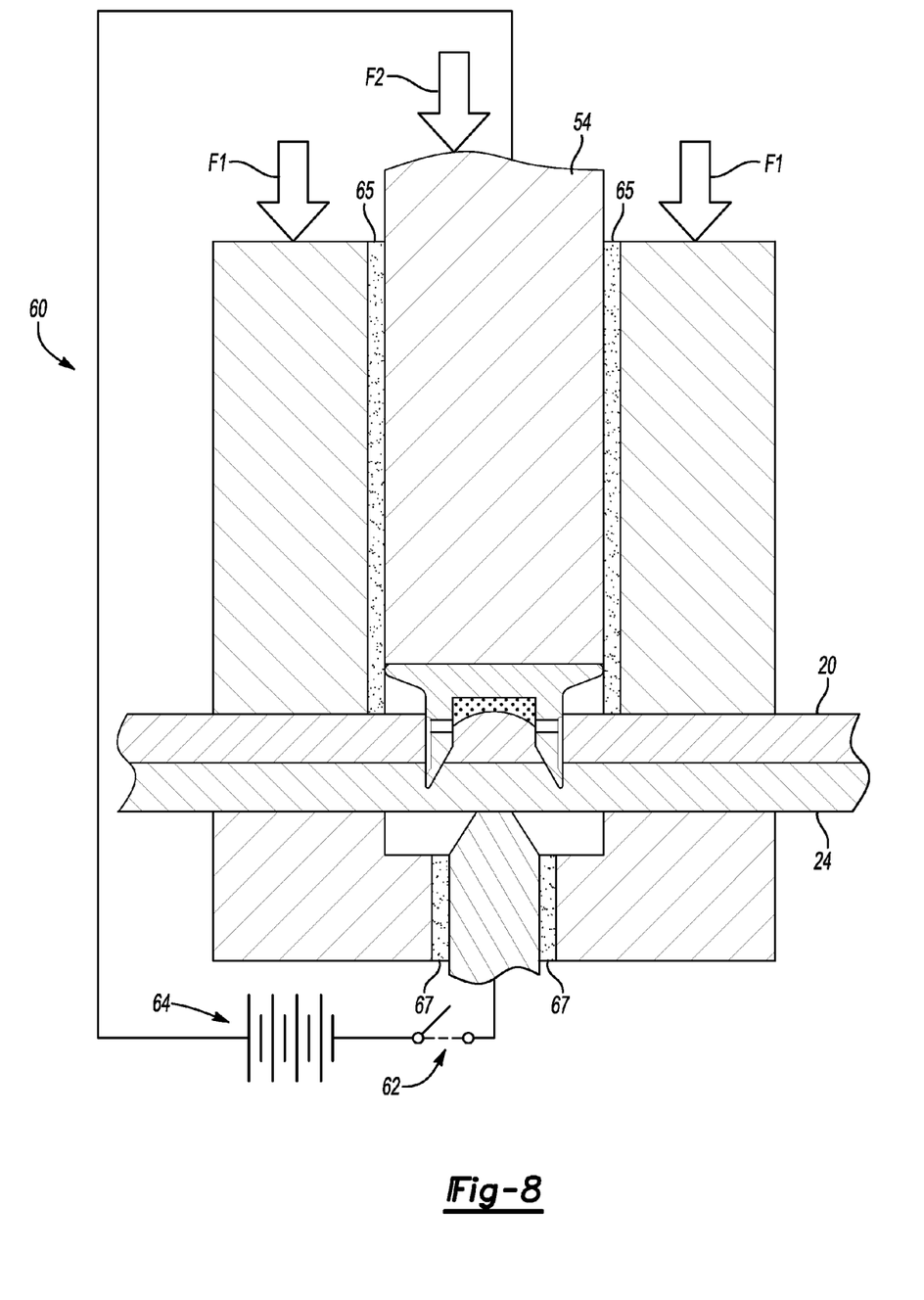
FIG. 8 is a schematic cross-sectional view of the die set and rivet assembly of FIGS. 6-7, with an electric current applied to the upper punch and lower die to heat the adhesive.
Figure 9:
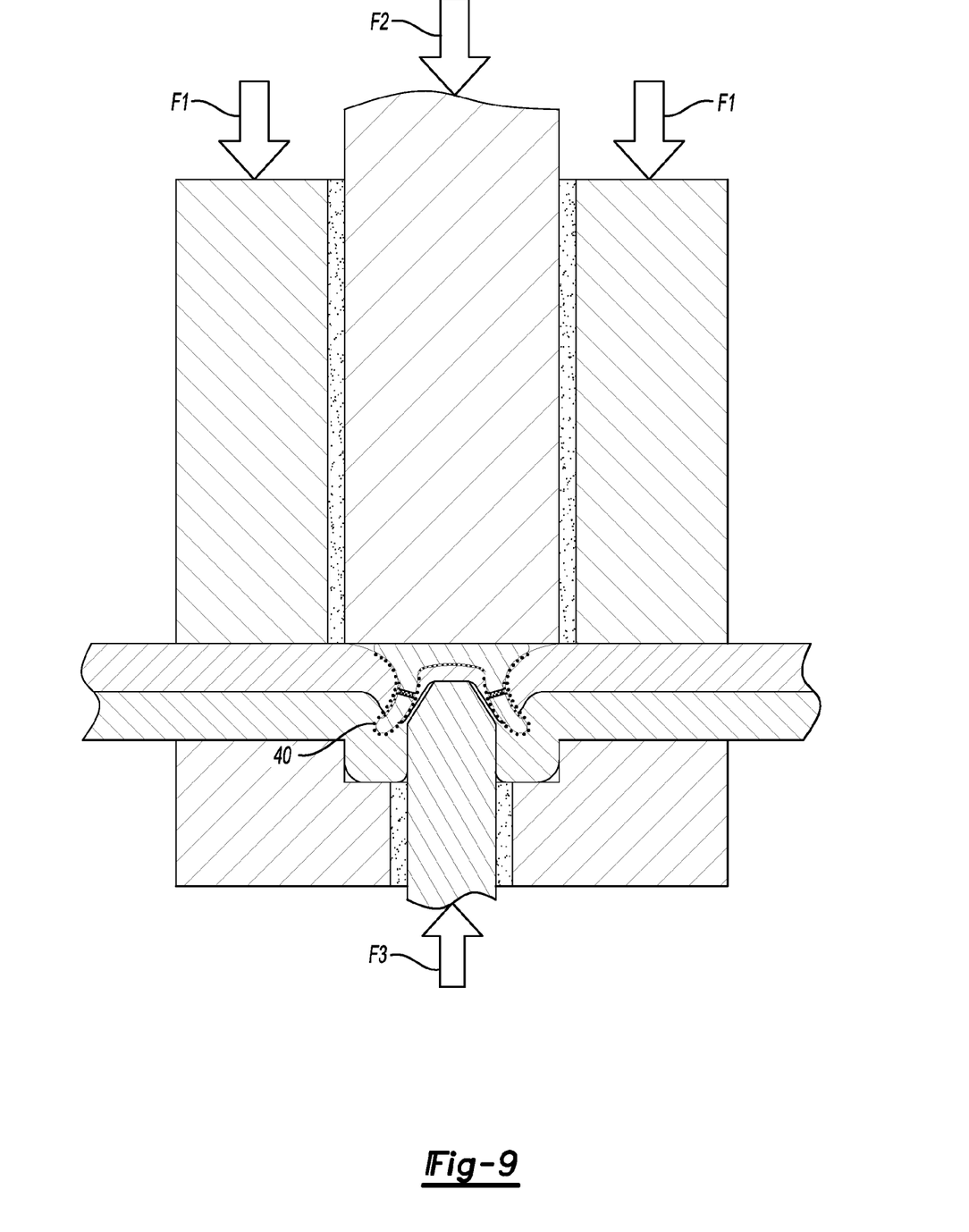
FIG. 9 is a schematic cross-sectional view of the die set and rivet assembly of FIGS. 6-8, with a movable die portion of the lower die pressing upward to force or expel some of the adhesive from the interior cavity through the passages and grooves of the rivet.

Referring to FIG. 8, an electric circuit 60 is created when a normally open switch 62 is closed (closed position shown in phantom) to allow current from a power supply 64 to flow through the punch 54 and the movable die portion 48 that is in contact with the adhesive 40, as well as through the rivet 10 and sheets 20, 24. (If a non-conductive rivet is used, the circuit may be modified to allow current flow that bypasses the rivet 10, but that generates heat sufficient to heat the adhesive 40.) The punch 54 is electrically insulated from the clamp 52 by isolator 65. The movable die portion 48 is electrically insulated from the annular portion 46 by isolator 67. The current causes resistive heating of the rivet 10, leading to conductive heating of the adhesive 40. At an elevated temperature, the adhesive 40 has a lower viscosity. Thus, after a predetermined amount of time or when the temperature of the die portion 48 reaches a predetermined temperature, the current is ceased by opening the switch 62. The downward force of the punch 54 is then resumed. Simultaneously, the movable die portion 48 is moved upward in the cavity 28 of the rivet 10 with a force F3. The opposing forces on the rivet 10 causes the sheets 20, 24 to be drawn about the shape of the die portion 48 and the body portion 14 of the rivet 10 to deform outward and interlock the sheets 20, 24, as illustrated in FIG. 8, while adhesive 40 is forced out of the cavity, through the passages 34 and along the grooves 36, as illustrated in FIG. 9 and best shown in FIG. 5, to bond the sheets 20, 24 at the rivet 10, including at the outer surface 25. The forces are controlled so that the rivet 10 passes into but not through the bottom sheet 24.

Figure 10:
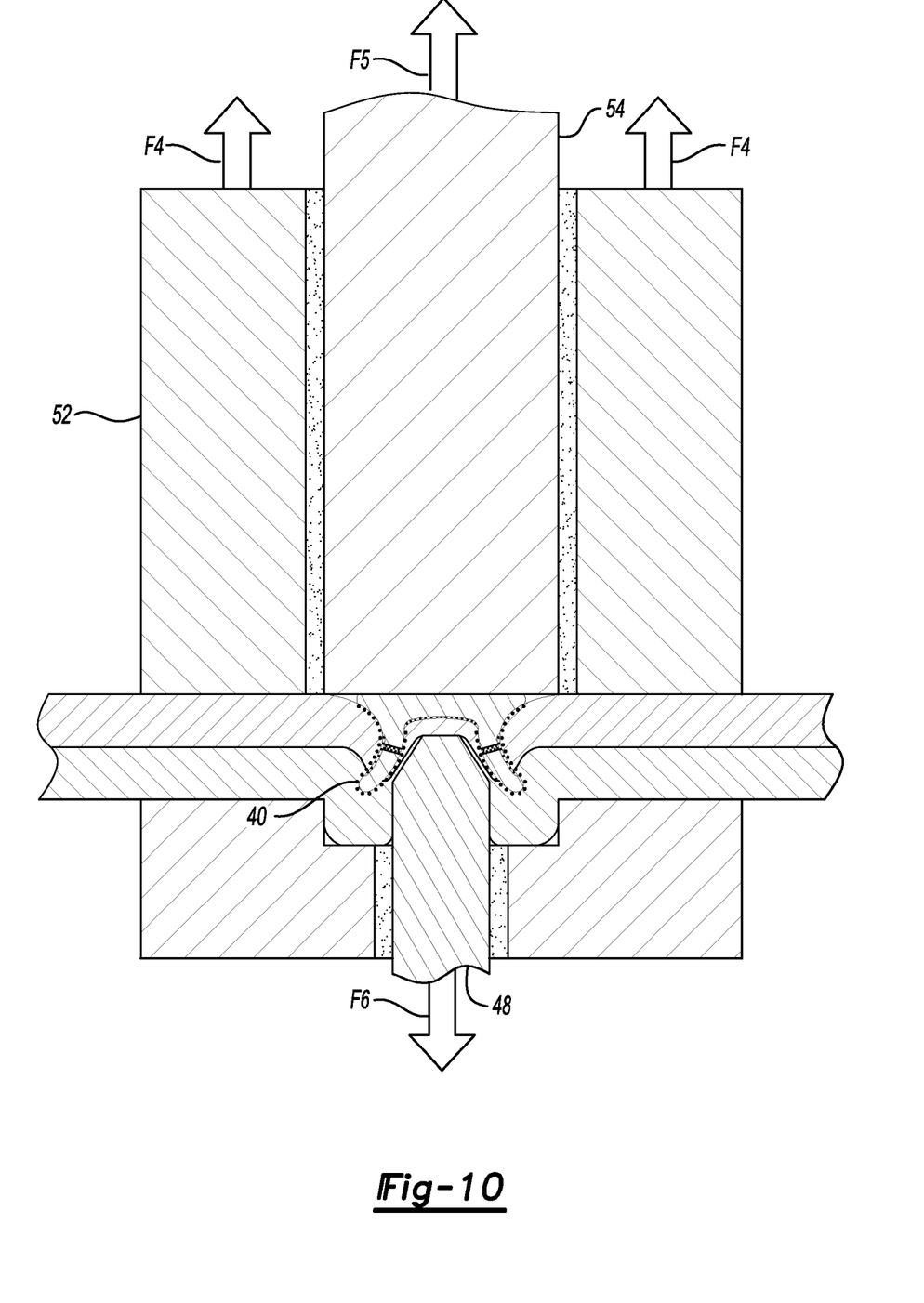
FIG. 10 is a schematic cross-sectional view of the die set and rivet assembly of FIGS. 6-9 with the movable die portion, the punch and the clamp withdrawn to allow release of the riveted sheets.

The clamp 52 and punch 54 are then withdrawn with forces F4, F5, respectively, and the movable die portion 48 is withdrawn with a force F6, as illustrated in FIG. 10. When the adhesive 40 is sufficiently cured at the bonded outer surface 25 of the rivet 10, the assembled sheets 20, 24 with bonded rivet 10 are then withdrawn from the die set 44.

Figure 11:
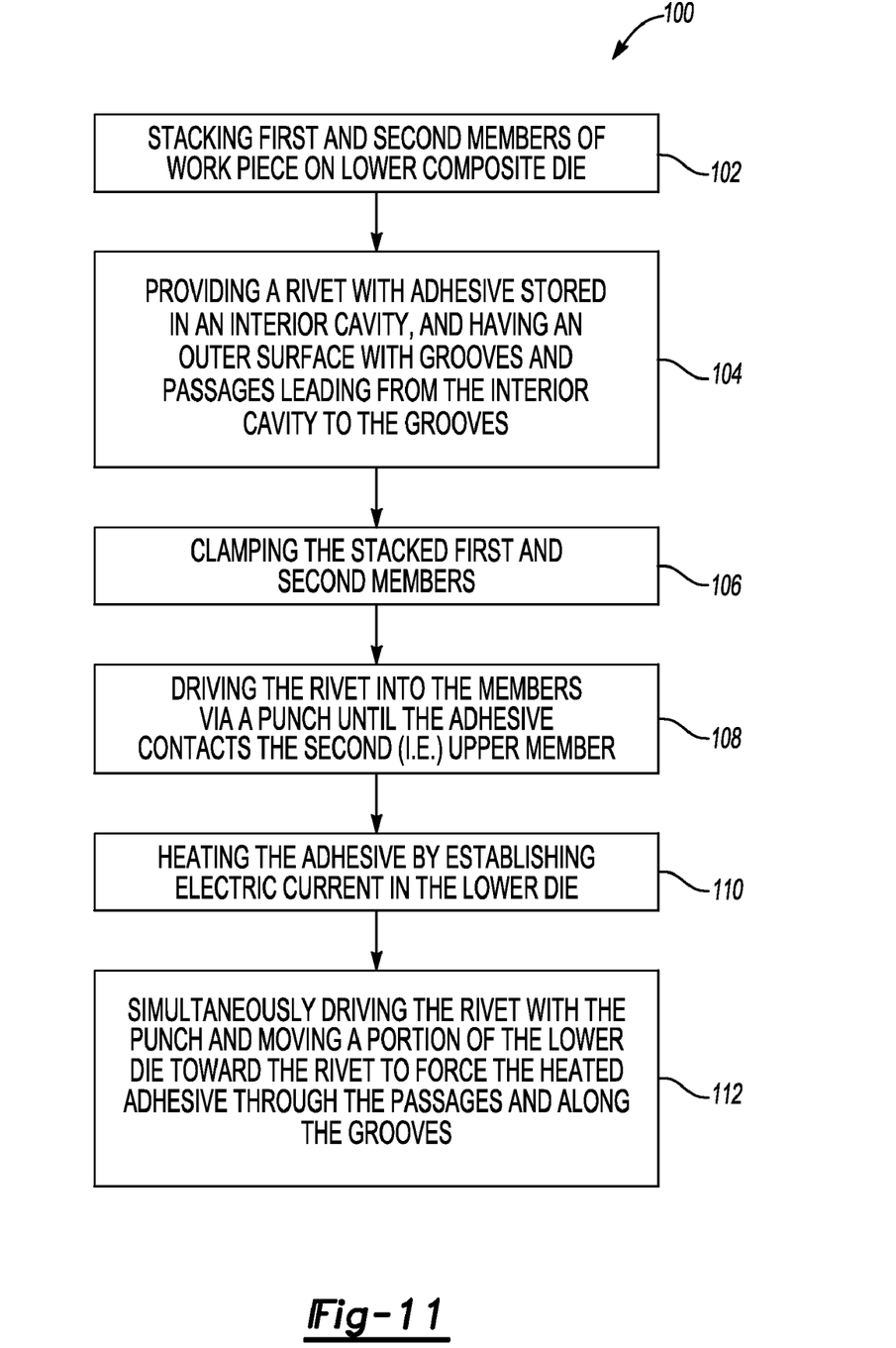
FIG. 11 is a flow diagram illustrating a method of joining the rivet of FIG. 1 to the sheets of FIG. 4 using the die set of FIGS. 6-10.

Referring to the flow diagram of FIG. 11, a method 100 of joining a multiple member work-piece is illustrated and is discussed herein with respect to the embodiments of FIGS. 1-10, although other embodiments may be used within the scope of the claimed invention. The method 100 includes step 102, stacking a first member 24 and a second member 20 of a work-piece 18 on a lower composite die 42. Additionally, under step 104, a rivet 10 is provided with adhesive 40 stored in an interior cavity 28. The rivet 10 has an outer surface 25 with grooves 36 and has passages 34 leading from the interior cavity 28 to the grooves 36. Under step 106, the stacked members 20, 24 are clamped between an upper die 50, which includes a clamp 52, and the annular outer portion 46 of the lower die 42.

With the stacked members clamped, the method progresses with step 108, in which the rivet 10 is driven into the sheet 20 until the adhesive 40 contacts the upper surface of sheet 20, causing the rapid increase in force F1 discussed above. At this point, the rivet 10 extends through the top sheet 20 and may or may not penetrate the bottom sheet 24, depending on the length of the body portion 14, thickness of the sheet 24, etc. but does not go through the bottom sheet 24. Next, under step 110, the adhesive 40 is heated using electric current running through the punch 54 and through the movable die portion 48 in contact with the adhesive 40. Once the adhesive 40 is heated to establish a sufficiently low viscosity, then, in step 112, punch 54 and movable die portion 48 are simultaneously forced toward the rivet 10, thereby deforming the rivet 10 to interlock the sheets 20, 24 and forcing the adhesive 40 through the passages 34 and along the grooves 36 of the outer surface 25 to bond the sheets 20, 24 to the outer surface 25 of the rivet 10 as well.

While the best modes for carrying out the invention have been described in detail, those familiar with the art to which this invention relates will recognize various alternative designs and embodiments for practicing the invention within the scope of the appended claims.

The invention claimed is:

1. A method of joining a multiple member work-piece, comprising:
    stacking first and second members of the work-piece on a composite lower die having a stationary annular outer portion and a movable die portion within the annular outer portion;
    clamping the stacked first and second members between an upper die and the lower die, with the first member resting adjacent the lower die; wherein the upper die includes a clamp and a punch movable within an opening in the clamp;

driving a rivet into the second member; wherein the rivet has a head portion and an annular body portion extending from the head portion and has an open end opposite the head portion; wherein the rivet is driven by the punch acting on the head portion; wherein the head portion and the annular body portion define an interior cavity that opens at the open end; wherein the annular body portion has an inner surface at the interior cavity and an outer surface opposite the interior cavity; wherein the body portion has passages extending through the body portion from the inner surface to the outer surface; and wherein the body portion has grooves running along the outer surface intersecting with the passages; wherein adhesive is stored within the interior cavity; wherein the driving is until the stored adhesive contacts the second member;

heating the adhesive; and after said heating, resuming driving the rivet with the punch and simultaneously moving the lower die portion toward the rivet, thereby causing the heated adhesive to be dispersed through the passages to the grooves to bond the rivet to the first and second members at the outer surface.

2. The method of claim 1, wherein the heating is resistance heating of the punch and movable die portion with an electric current.

3. A method of joining a first member to a second member, comprising:

providing a rivet with adhesive stored in an interior cavity of the rivet; wherein the rivet has an outer surface with grooves and passages leading from the interior cavity to the grooves;

driving the rivet into the first and second members until the adhesive contacts the second member;

heating the adhesive;

after said heating, resuming driving the rivet thereby forcing the adhesive through the passages to the grooves to bond the riveted joint; wherein the first and second members are different materials.

4. The method of claim 3, wherein the heating is by establishing electric current in a die in contact with the adhesive to cause resistance heating of the die.

5. The method of claim 4, wherein the resuming driving the rivet includes driving the rivet with a punch acting on the rivet and a movable die portion acting on the first member.

* * * * *